United States Patent [19]

Albrecht

[11] Patent Number: 4,807,382

[45] Date of Patent: Feb. 28, 1989

[54] FISHING ARROW

[76] Inventor: Larry Albrecht, 16630 Bowman Rd., Cotton Wood, Calif. 96022

[21] Appl. No.: 209,563

[22] Filed: Jun. 20, 1988

[51] Int. Cl.$^4$ .............................................. A01K 81/00
[52] U.S. Cl. .......................................... 43/6; 273/419
[58] Field of Search ................. 43/6, 5; 273/419, 421

[56] References Cited

U.S. PATENT DOCUMENTS

| | | | |
|---|---|---|---|
| 2,745,204 | 5/1956 | Myers | 43/6 |
| 3,036,395 | 5/1962 | Nelson | 273/421 |
| 3,766,678 | 10/1973 | Reaves | 43/6 |
| 4,101,126 | 7/1978 | Kurtz | 273/419 |
| 4,624,068 | 11/1986 | Howard | 43/6 |
| 4,642,929 | 2/1987 | Franklin | 43/6 |
| 4,685,239 | 8/1987 | La Monica | 43/6 |

FOREIGN PATENT DOCUMENTS 407846  3/1934  United Kingdom ................. 43/6

*Primary Examiner*—Gene P. Crosby
*Attorney, Agent, or Firm*—Roger A. Marrs

[57] ABSTRACT

An archery arrow is disclosed herein for use in shooting and catching fish which includes an elongated shaft having a notch on one end and pointed penetration member on the other end. The pointed member includes a multiple sided, tapered point detachably connected to a hook element carried on the end of the shaft. A pair of barbs forming the hook are pivotally carried on the hook element and terminate in a pointed flair. The hook element further includes a bendable portion useful in maintaining a caught fish hooked, and an arrow removal sleeve is provided for effecting release of a caught fish from the barbs of the hook.

5 Claims, 1 Drawing Sheet

FISHING ARROW

BACKGROUND OF THE INVENTION

1. Field of the Invention

The present invention relates to an archery arrow and more particularly to a novel arrow having improved barbed means for engaging a fish and holding the fish onto the arrow after the fish has been caught.

2. Brief Description of the Prior Art

It is the conventional practice when employing a bow and arrow in performing a fishing procedure, to not only employ a pointed arrow for penetration into the fish, but to include folding barbs on the point to prevent the fish from sliding off the arrow after penetration. Problems and difficulties have been encountered with conventional arrows having foldable barbs or wings which stem largely from the fact that the barbs expand after penetration through the fish, which causes extreme gouging of the flesh of the fish during the removal of the arrow. Also, the point of the arrow carrying the barbs is not replaceable and, in some instances, elaborate mechanisms are employed, permitting the barbs to reverse in folding so as to permit withdrawing of the arrow from the fish. In the latter instance, the barbs do not reverse fold together which again causes unnecessary gouging of the fish during arrow removal.

Another problem residing with conventional arrows employed in a fishing procedure is encountered after deployment of the foldable barbs due to rapid flailing of the fish, which causes the elongated arrow to gouge and tear so that a major portion of the fish is destroyed during the catch.

In other instances, problems are encountered with conventional arrows used for fishing which cause the arrow to plane or dart in the water after release from the bow so that it is difficult for the bowman to hit the fish target at which he is aiming. Also, problems have been encountered dealing with holding power, penetration and replacement of the point on the end of the arrow.

Therefore, a long standing need has existed to provide a novel point for an arrow which not only includes folding barbs but which will permit substantial holding power with better penetration and which will eliminate planing or darting through the water after released from the bow. The point should eliminate substantial gouging of the flesh of the fish and a replaceable point is required. Also, a quick release of the shaft from the point is useful in preventing gouging of the fish flesh and suitable means need to be provided for readily removing the expanded barb point from the fish after the fishing procedure has been completed.

SUMMARY OF THE INVENTION

Accordingly, the above problems and difficulties are obviated by the present invention which provides a novel fishing point for arrows which includes an elongated shaft having a nock at one end for releasable attachment to the bow string and which has a folding barbed point carried on the opposite end of the shaft. The barbs are characterized as being pivoted from a folded position around the point so as to permit ready penetration through the fish and which further includes flaired pointed tips on the end of each barb permitting rapid expansion to a position normal with respect to the central longitudinal axis of the point. Detachable coupling means are provided for placing a pointed end on the shaft while a shaft release is provided in the form of a cable construction interconnecting the shaft with the pointed tip or end whereby flailing of the fish avoids severe gouging. A barb release means is employed taking the form of an elongated sleeve adapted to insertably receive the pointed tip so as to collapse the folded barbs and a finger guard is carried on the sleeve for the safety of the user.

Therefore, it is among the primary objects of the present invention to provide a novel fishing point for an arrow which includes foldable barbs or wings adapted to lie within a recessed area about the point so as to permit ready penetration through the fish during a fishing procedure.

Another object of the present invention is to provide a novel barbed, pointed element for carrying on the end of an arrow wherein the barbs are readily deployable to a position normal with respect to the central longitudinal axis of the arrow and which are readily collapsible by means of a sleeve which forcibly urges the barbs into a closed position.

Still another object of the present invention is to provide a novel barbed tip for an archery arrow having a breakaway shaft arrangement that prevents gouging of the fish flesh after the fish has been shot by the arrow.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
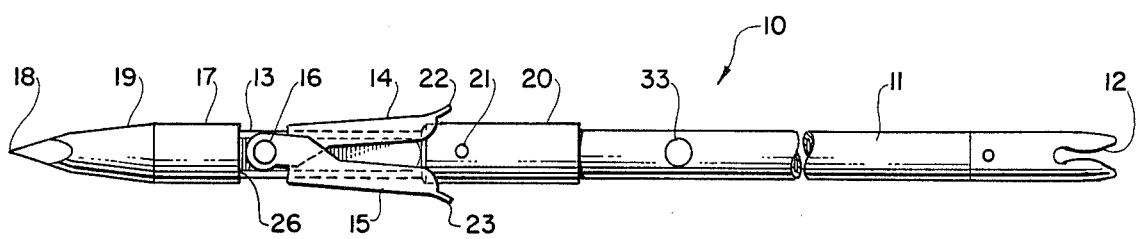
FIG. 1 is a side elevational view of the novel arrow incorporating the barbed point of the present invention.

Referring to FIG. 1, the novel folding barbed arrow of the present invention is illustrated in the general direction of arrow 10 which includes an elongated shaft 11 having a nock 12 carried at one end suitable for releasably engaging with the bow string of a conventional archer's bow. The opposite end of the shaft 11 mounts a hook element 13 having a pair of folding barbs 14 and 15 pivotally attached thereto by means of pivot connection 16. The extreme end of the hook member 13 is provided with a tip 17 terminating in a plurality or multiplicity of flat surfaces terminating in a point 18. A conical portion 19 interconnects the flats of the tip 18 with the cylindrical body 17 of the pointed end. Immediately behind the pair of folding barbs 14 and 15 when in their folded position, is a fixed connection to the end of the arrow 11 and the connection is identified by numeral 20. A conventional pin 21 serves as a connecting rod between the hook member and the end of shaft 11.

FIG. 1 further reveals that the hook member 13 is a reduced diameter between the body 17 and the coupling 20 so that the thickness of the barbs 14 and 15 substantially resides below the overall envelope or contour of the point so that easy penetration is achieved through the fish. The disposition of the barbs is slightly tapered outwardly towards the rear of the arrow which aids penetration and also exposes tips 22 and 23 for engaging with the opposite side of the fish which effects expansion of the barbs into the unfolded position as shown in FIG. 2.

Figure 2:
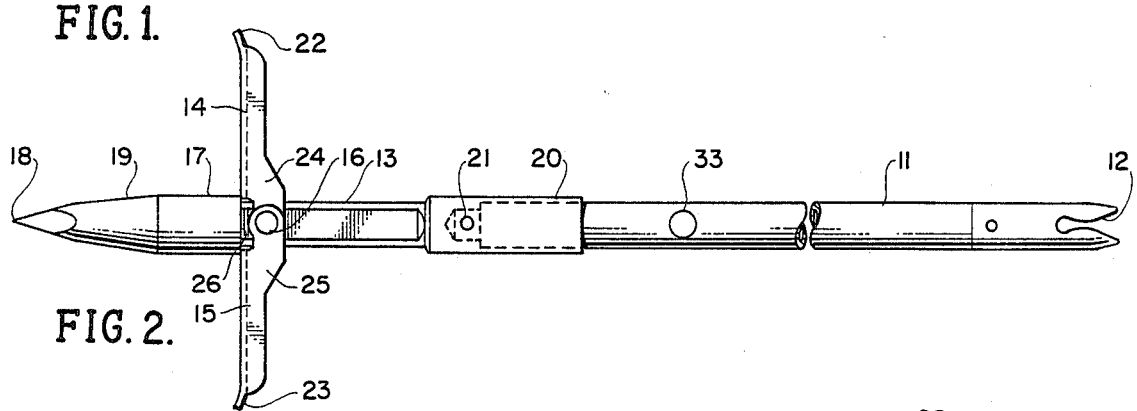
FIG. 2 is a view similar to the view of FIG. 1, illustrating the barbs in an unfolded position after penetration of a fish during the fishing procedure.

Referring now in detail to FIG. 2, it can be seen that the barbs 14 and 15 are fully expanded and that their bases 24 and 25 reside against an annular shoulder 26 provided on the end of the tip body 17. Thus, the barb extends at a 90° angle with respect to the longitudinal axis of the shaft 11.

Figure 4:
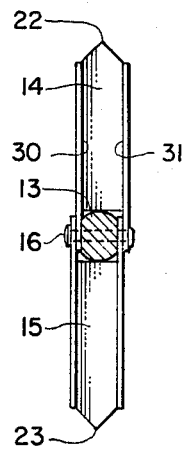
FIG. 4 is a transverse cross-sectional view of the folding barbs carried on the pointed end as taken in the direction of arrows 4—4 of FIG. 3.

Referring now in detail to FIG. 4, it can be seen that the folding barbs 14 and 15 terminate in tips 22 and 23 which are outwardly flaired and that the barbs include parallel side members 30 and 31 as illustrated with respect to barb 14. The side members are offset from one another to permit folding about the hook member 13 between the opposing shoulders of the point body 17 and the coupling 20.

Figure 3:
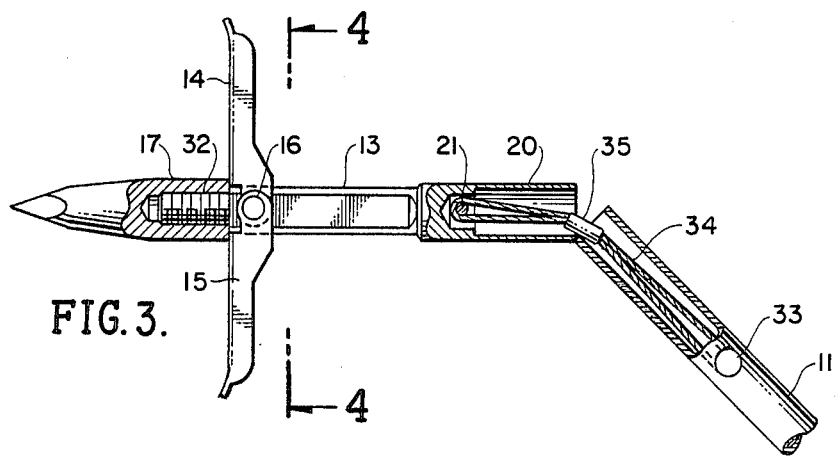
FIG. 3 is a longitudinal cross-sectional view of the novel pointed arrow having foldable barbs further incorporating a breakaway shaft.

Referring now in detail to FIG. 3, it is additionally illustrated that the hook element 13 carries the point member 17 in threaded engagement as generally illustrated by numeral 32. The threaded engagement permits replacement of the tip when necessary. The opposite end of the hook member is the coupler 20 which includes a cable connection looped about the pin 21 and a pin 33. The cable is identified by numeral 34 and includes an anti-friction member 35 which prevents the cable from rubbing against the edges of the breakaway mechanism. Therefore, it can be seen that the shaft 11 is connected to the hook member and the point via the cable 34; however, the shaft 11 is pivotal with respect to the hook member 13 so that flailing of the fish will not cause the shaft to unduly gouge the fish after the barbs have been unfolded.

Figure 5:
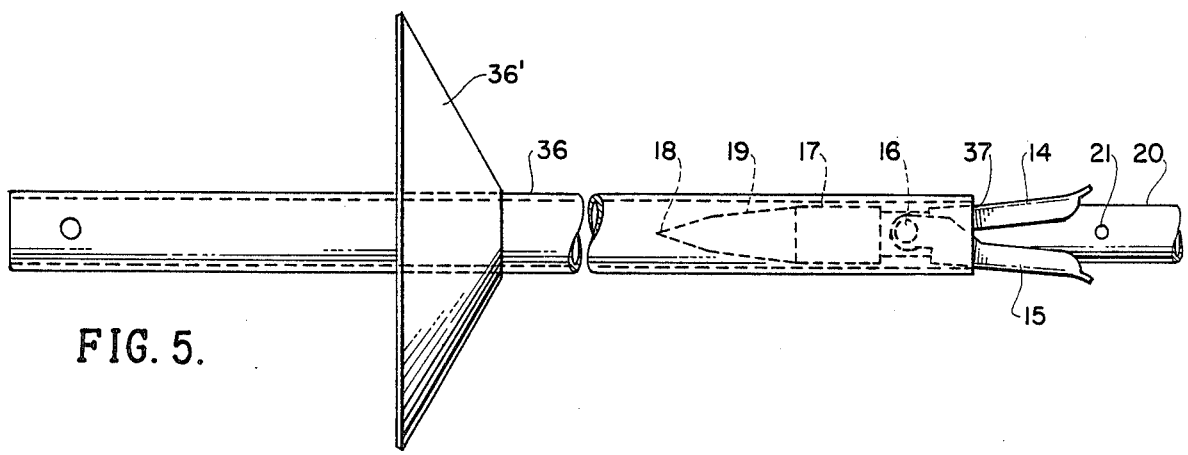
FIG. 5 is a side elevational view of a sleeve intended to effect the collapse of the extended barbs against the pointed end so that the shaft may be removed from the fish.

Referring to FIG. 5, it can be seen that a release mechanism for collapsing the barbs 14 and 15 is provided which takes the form of an elongated hollow sleeve 35 having a finger guard 36 at one end. The opposite end includes an opening 37 through which the pointed ends 17, 18 and 19 may be insertably received to where the end of the sleeve defining the opening 37 will engage with the exterior of the barbs in the folded condition so that when forced towards one another, the barbs will be collapsed about the shaft. After removal of the sleeve, the fish can then be removed from the arrow without further damage to the fish.

Therefore, it can be seen that the novel fishing arrow of the present invention provides an improved means for permitting the bowman to shoot fish with assurance that his arrow will not plane or dart about in the water and which will permit more ready penetration of the fish without damaging its flesh. Furthermore, retrieval of the fish with the barbs unfolded is more effective and prevents further damage to the fish than conventional folded barbs which cut, gouge and substantially damage the fish.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fishing arrow comprising:
an elongated shaft having a notch on one end and a pointed penetration member at the opposite end thereof;
said pointed member having a multiple-sided, tapered point detachably connected on said shaft;
a pair of barbs pivotally carried on said pointed member and each barb terminating in a flared point; and
said pointed member pivotally attached to said shaft and including means normally biasing said pointed member into coextension relationship with said shaft so that their respective central longitudinal axes are coextensive with each other.

2. The invention as defined in claim 1 wherein:
each of said barbs comprises a broad, flat member having rigid side flanges and movably mounted at adjacent ends to a pivot carried on said pointed member.

3. The invention as defined in claim 2 wherein:
said biasing means includes a pair of pins carried internally on said pointed member and on said shaft joined by an elastic member yieldably drawing said pointed member into coextensive relationship with said shaft.

4. The invention as defined in claim 3 wherein:
said barbs are pivotal between an expanded position at right angle to said pointed member and a stored position substantially parallel to each other about said pointed member.

5. The invention as defined in claim 4 including:
a hollow sleeve adapted to insertably receive said pointed member to forcibly engage and collapse said barbs when in its extended position.

* * * * *